United States Patent Office 3,637,893
Patented Jan. 25, 1972

3,637,893
OLEFIN DISPROPORTIONATION
David M. Singleton, Richmond, Calif., assignor to
Shell Oil Company, New York, N.Y.
No Drawing. Filed July 22, 1969, Ser. No. 843,765
Int. Cl. C07c 3/62, 11/02, 13/00
U.S. Cl. 260—683 D          8 Claims

ABSTRACT OF THE DISCLOSURE

Olefins are disproportionated with a catalyst produced by contacting (a) a molybdenum or tungsten oxide supported on an inorganic refractory oxide and (b) a perchlorohydrocarbon at elevated temperatures.

BACKGROUND OF THE INVENTION

Reactions of olefinic molecules in the presence of metal-containing catalysts to produce other olefinic molecules are known in the art, such as "disproportionation." A typical olefin disproportionation process is illustrated by U.S. 3,261,879, issued July 19, 1966, to Banks, wherein two similar molecules of an olefin react in the presence of certain catalysts to produce one olefin of a higher carbon number and one olefin of a lower carbon number. For example, propylene disproportionates by the process of U.S. 3,261,879 to produce ethylene and butylenes.

A variation of this disproportionation process which might be termed "reverse disproportionation" is illustrated by the Netherlands patent application 6514985 of British Petroleum Company, Limited, published May 20, 1966, wherein, in one modification, molecules of two dissimilar olefins are reacted to form two molecules of a single olefin product, e.g., ethylene and 2-butene react to form propylene.

Another variation of the process, being conveniently termed "ring opening disproportionation" to distinguish it from other variations, is disclosed by Netherlands patent application 6702703 of Phillips Petroleum Company, published Aug. 24, 1967, wherein a cyclic olefin and an acyclic olefin react to form a single product molecule. For example, ethylene reacts with cyclopentene by "ring opening disproportionation" to produce 1,6-heptadiene.

The term "disproportionation process" as herein employed is meant to include all variations of disproportionation reactions.

A variety of catalysts have been employed for conducting disproportionation reactions. One type of disproportionation catalyst comprises homogeneous catalyst compositions produced by contacting a tungsten salt and a hydrocarbon soluble organoaluminum compound. Although such catalyst compositions possess a high level of catalytic activity in disproportionation reactions, the organoaluminum compound precursors are expensive and present operational difficulties during production, storage and utilization in catalyst preparation. It would be of advantage to provide active disproportionation catalysts without the use of expensive aluminum compounds as catalyst precursors, particularly heterogeneous disproportionation catalysts, i.e., catalysts which are substantially insoluble in the reaction mixture since heterogeneous catalysts generally exhibit a number of operational advantages for large-scale industrial operations. For example, heterogeneous catalyst systems do not require elaborate means for separation of catalyst composition and reaction products due to the insolubility of the catalyst composition in the reaction mixture.

SUMMARY OF THE INVENTION

It has now been found that an improved process of disproportionating olefins is obtained through the use of a catalyst produced by contacting a molybdenum or tungsten oxide supported on an inorganic refractory oxide solid and a perchlorohydrocarbon at elevated temperature. The catalyst composition is catalytically active for disproportionating olefins at room temperature and is a heterogeneous composition, i.e., substantially insoluble in the disproportionation reaction mixture.

DESCRIPTION OF PREFERRED EMBODIMENTS

The olefinic reactants.—The process of the invention comprises the contacting of two olefinic reactants, which may be the same olefin or different olefins, in the presence of the disproportionation catalyst of the invention. The olefinic reactant comprises a hydrocarbon having at least one ethylenic linkage. The olefinic reactant is acyclic, monocyclic or polycyclic of up to four rings, preferably of two rings, and is a monoolefin or is a polyolefinic reactant preferably of up to three nonconjugated carbon-carbon double bonds. When the olefinic reactant is cyclic, at least one ethylenic linkage is a portion of a carbocyclic ring of at least five carbon atoms.

A class of suitable acyclic olefinic reactants is represented by the formula I $$RCH=CHR' \qquad (I)$$

wherein R and R' independently are hydrogen or alkyl of up to 18 carbon atoms with the total number of carbon atoms of the acyclic olefin, which total is herein termed "$n$," being no more than 30.

Illustrative of acyclic olefinic reactants represented by Formula I are propylene, 1-butene, 2-butene, 2-pentene, 3-hexene, 4-methyl - 1 - heptene, 2-decene, 6-dodecene, 3-tetradecene and 10-eicosene. In general, the preferred acyclic olefins are olefins of up to 20 carbon atoms, more preferably of up to 10 carbon atoms, and especially preferred are linear acyclic internal monoolefins, i.e., those olefins wherein both R and R' groups are n-alkyl.

A class of suitable cyclic olefinic reactants is represented by Formula II

(II)

wherein A is a divalent hydrocarbon moiety of from three to ten carbons and of up to three ethylenic double bonds which are portions of carbocyclic rings and is selected so that the carbon atoms depicted in the Formula II are members of a carbocyclic ring of at least five carbon atoms. The total number of carbon atoms of the cyclic olefinic reactant of Formula II which total is herein termed "$m$," is therefore from five to twelve.

Illustrative monocyclic olefinic reactants of Formula II include cyclopentene, cycloheptene, cyclooctene, cyclodecene, 1,5 - cyclooctadiene, 1,6-cyclodecadiene and 1,5, 9 - cyclododecatriene, whereas illustrative polycyclic olefinic reactants are illustrated by bicyclo(2.2.1)hepta-2,5-diene, bicyclo(2.2.1)hept - 2 - ene, tricyclo(4.2.10^{2,5})non-7-ene, tricyclo(5.2.1.0^{2,6})deca - 3,8 - diene, bicyclo(2.2.2) oct-2-ene, bicyclo(2.2.2)octa - 2,5 - diene, bicyclo(3.3.0) oct - 2 - ene, dicyclopentadiene (3a,4,7,7a - tetrahydro-4,7 - methanoidene), and quadricyclo(2.2.1.2^{2,6}.0^{3,5})non-8-ene. Particularly satisfactory results are obtained when the cyclic olefinic reactant is a monocyclic or a bicyclic olefinic reactant of up to two ethylenic linkages and most preferred are the monocyclic, monoolefinic reactants of from five to eight carbon atoms.

Another class of suitable olefinic reactants are polyolefinic compounds containing two or more non-conjugated double bonds. Illustrative polyolefins are 1,4-polybutadiene, 1,4 - polyisoprene and copolymers of styrene and butadiene.

When two different olefinic reactants are employed in the disproportionation process, the molar ratio of one olefinic reactant to the other olefinic reactant is not critical, and up to a 20-fold excess, preferably up to a 10-fold excess of one olefinic reactant can be employed.

The catalyst.—The precise chemical form of the catalyst is not known with certainty and the catalyst is best defined in terms of its method of production. The catalyst results from the intimate contact of (a) a molybdenum or tungsten oxide supported on an inorganic oxide solid and (b) a perchlorohydrocarbon at elevated temperatures.

The oxide of molybdenum and tungsten is preferably combined with the inorganic oxide solid support in a high positive oxidation state, e.g., hexavalent molybdenum or hexavalent tungsten. The proportion of the molybdenum or tungsten oxide combined with the alumina-containing inorganic oxide can be varied, but generally the inorganic oxide solid contains at least 0.1% by weight of the oxide of molybdenum or tungsten with amounts from about 0.2% to about 50% by weight being preferred, although still larger (major) proportions of molybdenum or tungsten oxide can be used.

The inorganic oxide solid comprises an acidic, solid inorganic oxide support containing a major proportion of alumina or silica. Such materials are commonly known as refractory oxides and include, for example, silica, alumina, magnesia-alumina, silica-alumina, titania-alumina, zirconia-alumina, and alumina-titania-zirconia. Preferred refractory metal oxides are alumina refractory oxides, i.e., refractory oxides containing a substantial proportion of alumina, e.g., at least 10% by weight of alumina, preferably at least 25% of alumina, although still larger proportions of alumina can be used. Generally, the refractory oxide has a surface area of at least 10 m.$^2$/g. and preferably the surface area is from about 25 m.$^2$/g. to 800 m.$^2$/g.

The molybdenum or tungsten oxide is combined with the alumina refractory oxide support by any conventional method such as dry-mixing, impregnation, ion-exchange and the like.

The molybdenum or tungsten oxide-alumina composition employed as a catalyst precursor is optionally, and preferably, subject to a pretreatment prior to utilization in preparation of the catalyst. The precise method of pretreatment will depend in part upon the form of chemical combination in which the molybdenum or tungsten components are provided, but in general the pretreatment comprises heating an initially prepared molybdenum or tungsten containing alumina refractory oxide in an atmosphere of a non-reducing gas such as nitrogen, argon, carbon monoxide or oxygen-containing gas, e.g., air. One function served by this type of pretreatment is to convert the molybdenum and tungsten components into the form of the oxide if these components are not initially provided in these forces. For example, initial catalyst components such as ammonium tungstate and ammonium molybdenum are converted to the corresponding oxide by heating in a non-reducing atmosphere. The pretreatment temperature is not critical and temperatures from about 350° C. to 800° C. are satisfactory.

The catalyst is prepared by contacting the molybdenum or tungsten-oxide-alumina refractory oxide composition with a perchlorohydrocarbon containing only the atoms of chlorine and carbon. Suitable perchlorohydrocarbons are those of from 1 to 6 carbon atoms and, preferably, are free of acetylenic unsaturation. Illustrative suitable perchlorohydrocarbons are carbon tetrachloride, tetrachloroethylene, hexachloroethane, hexachloropropene, hexachlorobutadiene, octachloropropane, and hexachlorocyclopentadiene. Largely because of availability, the preferred perchlorohydrocarbon is carbon tetrachloride.

In general, the molybdenum or tungsten oxide-alumina refractory oxide composition is contacted in fluid phase, i.e., gaseous or liquid phase, with from about 1% to 600% by weight of perchlorohydrocarbon based on total weight of molybdenum or tungsten oxide refractory oxide composition, but preferably from about 10% to 30% by weight of perchlorohydrocarbon, calculated on the same basis. Suitable contact temperatures vary from about 100° C. to 400° C., preferably from about 200° C. to 300° C. and suitable pressures vary from about 15 p.s.i.g. to 1000 p.s.i.g. Contact times of about 1 to 24 hours are generally satisfactory. In a preferred modification, the catalyst is prepared in the presence of an inert gaseous diluent, such as nitrogen and hydrogen, and in the substantial absence of reactive materials such as water and oxygen.

Subsequent to the contacting of the molybdenum or tungsten oxide-alumina refractory oxide composition with carbon tetrachloride, the resulting catalyst is separated from the excess carbon tetrachloride by conventional techniques, such as filtration, decantation or evaporation.

Reaction conditions.—The disproportionation of the olefinically unsaturated compounds can be carried out at temperatures between −10 and 350° C. Temperatures between 0° C. and 150° C. are suitable, while temperatures between 20° C. and 75° C. are preferred. One of the advantages of the present disproportionation process is that it can be carried out at room temperature or slightly above, so that no heating equipment is required.

The disproportionation reaction can be carried out by contacting the olefins to be disproportionated with the catalyst in the liquid phase or the gas phase, depending on structure and molecular weight of the olefins, temperature and pressure.

The pressure during the disproportionation reaction may vary between wide limits. Pressures between 0.1 and 500 atm. are suitable; preferred pressures are between 0.5 and 250 atm. If possible, the process should be operated at a pressure which is atmospheric or nearly atmospheric, so that no vacuum or pressure apparatus is required.

If the reaction is carried out in the liquid phase, solvents or diluents for the reactants may be used. Aliphatic saturated hydrocarbons (e.g., pentane, hexane, cyclohexane, dodecane) and aromatic hydrocarbons such as benzene and toluene are suitable. If the reaction is carried out in the gaseous phase, diluents such as aliphatic hydrocarbons (e.g., methane, ethane) and/or inert gases (e.g., nitrogen, carbon dioxide) may be present. Preferably the disproportionation reaction is effected in the substantial absence of reactive materials such as water and oxygen.

The length of time during which the olefinically unsaturated compounds to be disproportionated are contacted with the catalyst is not very critical, and may conveniently vary between 5 seconds and 24 hours, although longer and shorter contact times may be used. The contact time needed to obtain a reasonable yield of disproportionated products depends on several factors such as the activity of the catalyst, temperature, pressure and structure of the olefinically unsaturated compounds to be disproportionated.

The process of the invention is effected batchwise or continuously, with fixed catalyst beds, slurried catalysts, fluidized beds or by using any other conventional contacting technique. The solid disproportionation catalysts are applied in any appropriate form, for example, as powders, flakes, pellets, spheres or extrudates.

The Products.—According to the process of the invention two olefinic reactants are disproportionated to a product comprising olefin(s) having a total number of carbon atoms equal to the sum of the carbon atoms of the two olefinic reactants and having a number of ethylenic linkages equal to the sum of the ethylenic double bonds of the reactants.

One variation of the process comprises the disproportionation of two molecules of the same olefinic reactant. The reaction of two molecules of an acyclic olefin of Formula I generally produces one olefin of a higher carbon number and one olefin of a lower carbon number as depicted in equation (1)

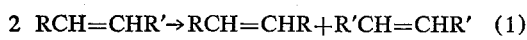

$$2\ RCH=CHR' \rightarrow RCH=CHR + R'CH=CHR' \quad (1)$$

wherein R and R' have the previously stated significance. If R and R' represent identical groups, it is appreciated that the disproportionation reaction will not cause any skeletal changes as the products RCH=CHR and R'CH=CHR' will be equivalent to R'CH=CHR. By way of specific illustration, the reaction of two molecules of propylene produces ethylene and 2-butene. However, the reaction of two molecules of 2-butene produces two molecules of 2-butene. The reaction of two molecules of cyclic olefinic reactant of Formula II, however, produces a single cyclic olefin produced as depicted in equation (2)

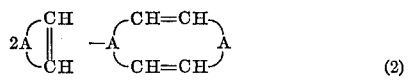

(2)

By way of specific illustration, the reaction of two molecules of cyclooctene produces 1,9-cyclohexadecadiene.

Another variation of the process comprises the disproportionation of two different acyclic olefinic reactants. By way of specific illustration, the reaction of 2-butene and 3-hexene produces two molecules of 2-pentene and the reaction of 2-butene with 1,4-polybutadiene produces two molecules of 1,4-polybutadiene having a molecular weight which is less than the molecular weight of the starting 1,4-polybutadiene.

Still another variation of the process is "ring-opening" disproportionation wherein an acyclic olefinic reactant representedo by Formula I is contacted with a cyclic olefinic reactant represented by Formula II. The product of "ring-opening" is a single olefinic compound with one less carbocyclic ring than the cyclic olefinic reactant of Formula II. In terms of the Formulas I and II, the product is represented by Formula III.

(III)

wherein R, R' and A have previously stated significance. By way of specific illustration, from reaction of 2-butene and cyclopentene is produced 2,7-nonadiene. Other typical products include 2,8-decadiene produced by reaction of cyclohexene and 2-butene, 3,8-undecadiene produced from 3-hexene and cyclopentene, 1,5,9-decatriene produced by reaction of ethylene and 1,5 - cyclooctadiene, and 1,4 - divinylcyclohexane from ethylene and bicyclo (2.2.2)oct-2-ene.

In "ring-opening" disproportionation, the cyclic olefinic reactant is preferably by a monocyclic or a bicyclic olefinic reactant of up to two ethylenic linkages and most preferably is a monocyclic, monoolefinic reactant of from five to eight carbon atoms, and the acyclic olefinic reactant is preferably an internal olefin which is symmetrical about the double bond, i.e., those olefins wherein both R and R' groups are alkyl and R=R'. The molar ratio of cyclic olefinic reactant to the acyclic olefin in ring-opening disproportionation is not critical, although it is frequently useful to employ a molar excess of the acyclic olefin. Molar ratios of acyclic olefin to cyclic olefin reactant from about 1:1 to about 20:1 are satisfactory with molar ratios from about 1:1 to about 0:1 being preferred.

It is appreciated that an olefinic product produced by any variation of the disproportionation process can undergo further disproportionation with another olefin present in the reaction mixture. For example, 1,6-heptadiene produced from reaction of cyclopentene and ethylene can react with another molecule of cyclopetene to produce 1,6,11-dodecatriene, and 1,9-cyclohexadecadiene produced from reaction of two molecules of cyclooctene can react with additional molecules of cyclooctene to give a high molecular weight monocyclic polyene.

The olefinic products, for the most part, have established utility as precursors of polymers, e.g., as the third component of ethylene-propylene terpolymers useful as synthetic elastomers. Cleavage of the ethylenic bonds of polyolefinic products as by ozonization produces di- or polycarboxylic acids which are reacted with diamines, e.g., hexamethylenediamine, to form Nylons which are useful in synthetic fibers. The olefinic products are converted to secondary and tertiary alcohols as by sulfuric acid-catalyzed hydration. Alternatively, the olefinic products are converted by conventional "Oxo" processes to aldehydes which are hydrogenated with conventional catalysts to the corresponding alcohols. The $C_{12}$-$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

Example I (A) A 39 g. sample of commercial silica-alumina (24% wt. alumina and surface area of about 270 m²./g.) was contacted with a solution of 14.9 g. of ammonium metatungstate in 70 ml. of water. The impregnated silica-alumina was dried at 120° C. and then calcined at 400° C. for 16 hours. The resulting tungsten oxide-silica-alumina composition contained 29.6% by weight of tungsten, calculated as the metal.

(B) A 5.2 g. sample of the above tungsten oxide-silica-alumina composition was contacted with 10 ml. of carbon tetrachloride at a temperature of 275° C. for 1.5 hours. After cooling, the excess carbon tetrachloride and phosgene were removed by vaporization under a stream of nitrogen and solid residue was extracted with benzene and then dried.

A 0.5 g. sample of the resulting carbon tetrachloride treated tungsten oxide-silica-alumina composition was contacted with 5 ml. of 2-pentene in 10 ml. of benzene under an atmosphere of nitrogen at a temperature of about 25° C. for 20 minutes. Gas chromatographic analysis of the resulting reaction mixture showed presence of 2-butene, 2-pentene and 3-hexene in the molar ratio of 1:3.5:1, which corresponds to a 72% conversion of 2-pentene.

(C) For comparison, a 0.5 g. sample of the tungsten oxide-silica-alumina composition of Example I(A) was contacted with 5 g. of 2-pentene in 10 ml. of benzene at about 25° C. After a contact period of 25 hours, no disproportionation of the 2-pentene could be detected by gas chromatographic analysis.

Example II

A 84.5 g. sample of commercial silica-alumina (24% wt. alumina and surface area of 200 m.²/g.) was contacted with a solution of 29.7 g. of ammonium metatungstate in 140 ml. of water. The impregnated silica-alumina was dried at 120° C. and then calcined at 480° C. for 16 hours. The resulting tungstic oxide-silica-alumina composition contained 23.9% wt. of tungsten, calculated as the metal.

Example III

A 6.5 g. sample of tungsten oxide-silica-alumina composition of Example II was contacted in a 83 ml. autoclave with 5.8 g. of carbon tetrachloride under an atmosphere of nitrogen (200 p.s.i.g.) at a temperature of 200° C. for 1.5 hours. After cooling to about 25° C., the reaction mixture was vented and flushed with nitrogen. Analysis of the resulting solid showed 3% by weight of tungsten, calculated as the metal and 38% by weight of chlorine.

A 0.5 g. sample of resulting carbon tetrachloride treated tungsten oxide-silica-alumina composition was contacted with 5 ml. of 2-pentene in 10 ml. of benzene under an atmosphere of nitrogen at 25° C. for 30 minutes. Gas chromatographic analysis showed the presence of 2-butene, 2-pentene and 3-hexene in a molar ratio of 1:2.2:1, which corresponds to a 2-pentene conversion of 94%.

Example IV (A) A 6.5 g. sample of tungsten oxide-silica-alumina composition of Example II was contacted in a 83 ml. autoclave with 5.8 g. of carbon tetrachloride under an atmosphere of hydrogen (200 p.s.i.g.) at a temperature of 200° C. for 2 hours. After cooling to about 25° C., the reaction mixture was vented and flushed with nitrogen.

(B) A 0.5 g. sample of the carbon tetrachloride treated composition of Example IV(A) was contacted with 5 ml. of 2-pentene in 10 ml. of benzene under an atmosphere of hydrogen (200 p.s.i.g.) at 25° C. for 15 minutes. Gas chromatographic analysis of the reaction mixture showed the presence of 2-butene, 2-pentene and 3-hexene in a molar ratio of 1:2:1, which corresponds to a 100% conversion of 2-pentene.

(C) A sample of the carbon tetrachloride treated composition of Example IVA is contacted with a mixture of bicyclo(2.2.1)hept-2-ene and 2-butene in a autoclave by a procedure similar to that of Example IV(B). Gas chromatographic analysis of the reaction mixture shows a good yield of 1,3-dipropenylcyclopentane.

Example V

An alumina composition containing 15% wt. of molybdenum oxide is prepared by impregnating alumina with an aqueous solution of ammonium paramolybdate, and subsequently drying and calcining the resulting alumina composition by a procedure similar to that of Example III.

A sample of the above molybdenum oxide-alumina composition is treated with perchloroethane and then contacted with a mixture of cyclooctene and 2-butene by a procedure similar to that of Example IVA and IVB. Gas chromatographic analysis of the product mixture shows a good yield of 2,10-dodecadiene arising from the ring opening disproportionation of cyclooctene with 2-butene.

Example VI

A sample of the perchloroethane treated catalyst composition of Example IB is contacted with an equimolar mixture of 11-docosene and 2-butene at room temperature in a stoppered vessel under an atmosphere of nitrogen. Gas chromatographic analysis of the reaction mixture shows an olefinic product mixture comprising substantial amounts of 2-tridecene.

Example VII

A sample of the perchloroethane treated catalyst composition of Example IB is contacted with a solution of 2-butene and polybutadiene polymer (cis-1,4-content of about 96%, molecular weight of about 100,000) in toluene at room temperature in a stoppered vessel under an atmosphere of nitrogen for several hours. The resulting product mixture comprises a polybutadiene of lower-molecular weight than the starting polymer.

I claim as my invention:

1. A process of disproportionating two non-conjugated olefinic reactants to a product comprising olefin(s) having a total number of carbon atoms equal to the sum of the carbon atoms of the two olefinic reactants and having a number of ethylenic linkages equal to the sum of the ethylenic double bonds of the two olefinic reactants by contacting the two olefinic reactants at a temperature of from about 20° C. to 75° C. in the presence of a catalyst produced by intimately contacting at a temperature from about 100° C. to about 400° C. (a) an inorganic refractory oxide containing at least 0.1% by weight of molybdenum oxide or tungsten oxide and (b) a perchlorohydrocarbon of from 1 to 5 carbon atoms.

2. The process of claim 1 wherein the olefinic reactants are selected from acyclic hydrocarbon monoolefin of up to 30 carbon atoms and cyclic hydrocarbon olefin of up to 4 carbocyclic rings, of up to 12 carbon atoms and up to 3 ethylenic linkages, the carbon atoms of at least one ethylenic linkage each having a hydrogen substituent and being members of a carbocyclic ring of at least 5 carbon atoms.

3. The process of claim 2 wherein the refractory oxide contains from about 0.2% to 50% by weight of molybdenum oxide or tungsten oxide.

4. The process of claim 3 wherein the refractory oxide is an alumina refractory oxide.

5. The process of claim 4 wherein two acyclic monoolefinic reactants are contacted.

6. The process of claim 4 wherein the acyclic monoolefinic reactant and the cyclic olefinic reactant are contacted.

7. The process of claim 4 wherein the perchlorohydrocarbon is carbon tetrachloride.

8. The process of claim 4 wherein the alumina refractory oxide is silica-alumina.

References Cited

UNITED STATES PATENTS

| 2,831,037 | 4/1958 | Schmerling | 260—666 |
| 3,261,879 | 7/1966 | Banks | 220—683 |
| 3,544,647 | 12/1970 | Pennella | 260—683 |

DELBERT E. GANTZ, Primary Examiner

C. E. SPRESSER, Jr., Assistant Examiner

U.S. Cl. X.R.

260—94.7 D, 666 A, 677 R, 680 R